US008490289B2

(12) United States Patent
Nystrom et al.

(10) Patent No.: US 8,490,289 B2
(45) Date of Patent: Jul. 23, 2013

(54) HANDLE JOINED OF TWO SECTIONS FOR A HAND HELD ENGINE POWERED TOOL

(75) Inventors: Mattias Nystrom, Skeppshult (SE); Magnus Andersson, Vreta Kloster (SE); Stefan Kullberg, Jonkoping (SE); Par Martinsson, Jonkoping (SE); Peter Bjorkman, Nassjo (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 10/532,353

(22) PCT Filed: Oct. 23, 2003

(86) PCT No.: PCT/SE03/01650

§ 371 (c)(1), (2), (4) Date: Jul. 5, 2005

(87) PCT Pub. No.: WO2004/037494

PCT Pub. Date: May 6, 2004

(65) Prior Publication Data

US 2005/0257943 A1 Nov. 24, 2005

(30) Foreign Application Priority Data

Oct. 25, 2002 (SE) .................................... 0203159

(51) Int. Cl.

*B27B 5/29* (2006.01)
*B27B 19/09* (2006.01)
*B23B 45/00* (2006.01)

(52) U.S. Cl.

USPC ................ 30/166.3; 30/381; 30/376; 30/392; 173/70

(58) Field of Classification Search

USPC ................ 30/166.3, 381, 382, 383, 376, 392; 123/179.18, 179.16, 73, 98, 179.5, 52, 179.19; 261/52, 65, 64.6, 64.4; 227/131, 156, 19, 227/DIG. 1, 67; D8/1, 7–9

See application file for complete search history.

(56) References Cited

U.S. PATENT DOCUMENTS

| | | | | | |
|---|---|---|---|---|---|
| 2,263,136 | A | * | 11/1941 | Knouse et al. | 30/374 |
| 2,908,263 | A | * | 10/1959 | Brown | 123/395 |
| 3,494,431 | A | * | 2/1970 | Yoho et. al. | 173/202 |
| 4,079,708 | A | * | 3/1978 | Wieland et al. | 123/376 |
| 4,761,939 | A | | 8/1988 | Zerrer | |
| 4,946,087 | A | | 8/1990 | Wingert | |
| 5,065,476 | A | * | 11/1991 | Dohse et al. | 16/426 |
| 5,215,049 | A | * | 6/1993 | Wolf | 123/179.18 |
| 5,233,945 | A | * | 8/1993 | Wolf et al. | 123/41.7 |
| 5,485,814 | A | * | 1/1996 | Tuggle et al. | 123/179.5 |
| 5,517,967 | A | * | 5/1996 | Nakayama | 123/398 |
| 5,738,064 | A | * | 4/1998 | Lowe et al. | 123/198 E |
| 5,862,713 | A | * | 1/1999 | Tsunoda et al. | 74/526 |
| 5,960,549 | A | * | 10/1999 | Hoppner | 30/381 |
| 6,871,623 | B2 | * | 3/2005 | Ohsawa et al. | 123/179.18 |
| 2003/0088987 | A1 | * | 5/2003 | Jong | 30/381 |
| 2004/0098869 | A1 | * | 5/2004 | Ashfield | 30/383 |

* cited by examiner

*Primary Examiner* — Ghassem Alie

(74) *Attorney, Agent, or Firm* — Nelson Mullins Riley & Scarborough LLP

(57) ABSTRACT

A handle for a hand held engine powered tool may include at least one lever or button for controlling the tool. The handle is made of at least two handle sections joined together. The lever or button for controlling the tool is however only secured in one of the handle sections in order to reduce the required grade of precision between the handle sections without affecting the performance of the lever or button.

6 Claims, 2 Drawing Sheets

HANDLE JOINED OF TWO SECTIONS FOR A HAND HELD ENGINE POWERED TOOL

Figure 1:
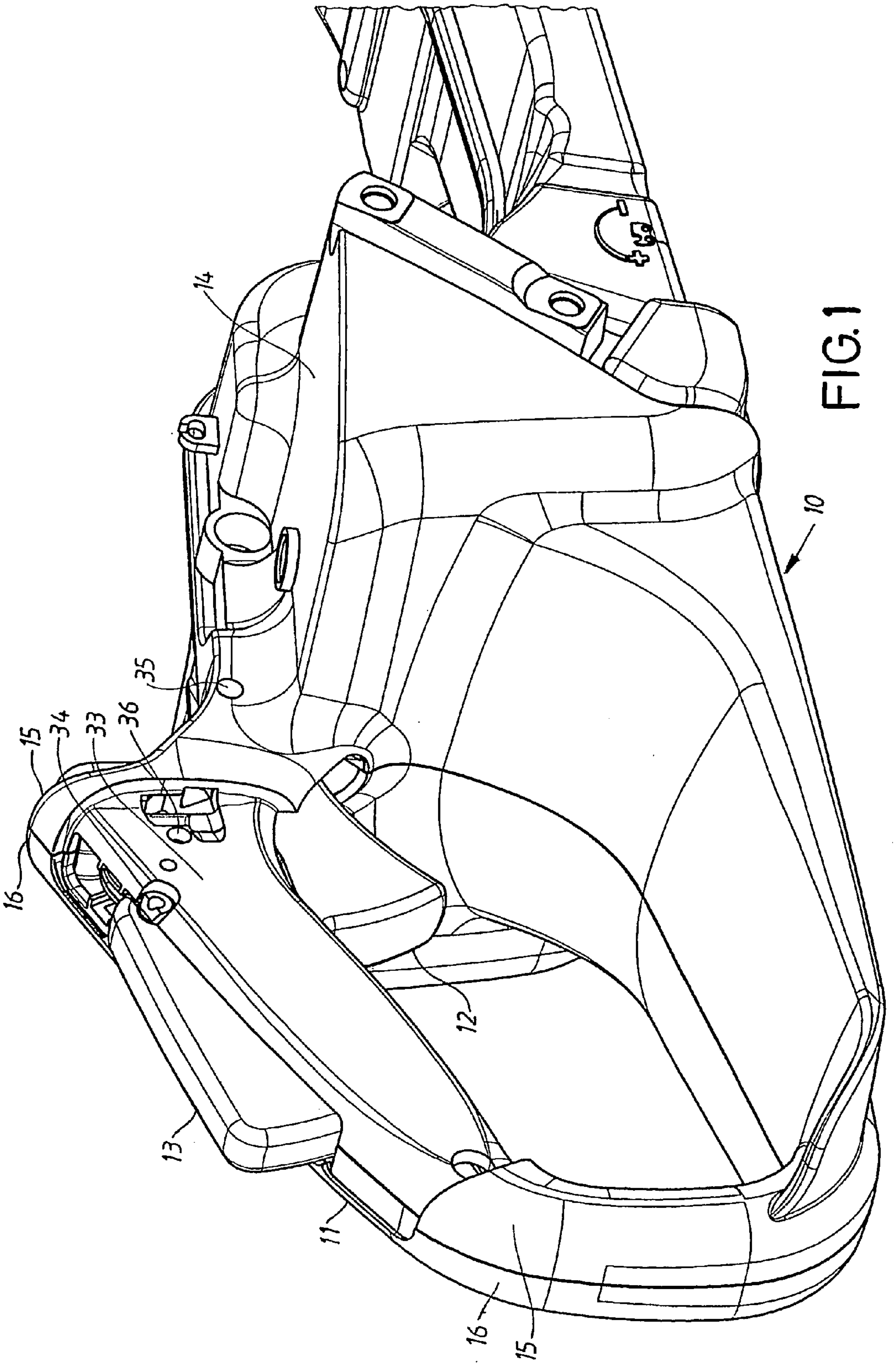

This application claims the benefit of International Application Number PCT/SE2003/001650, which was published in English on May 6, 2004.

The claimed invention relates to a handle for a handheld engine powered tool comprising at least one lever or button for controlling the power of the engine. Said handle is generated by at least two sections joined together.

Portable tools must be easy for the operator to maneuver and control. In order to achieve this is it important that the design of the tool is compact so that the actual size of the tool is minimized. The weight of the tool is preferably kept as low as possible since the weight of the tool is an important factor that affects the working conditions for the operator.

The requirements for compact and light tools to make the tools easy to maneuver have strongly influenced the design of the tools. A section of the fuel tank in a chain saw is for example normally placed inside the handle on the back of the chain saw to minimize the size of the tool and use the space inside the tool housing as efficient as possible.

The fuel tank and the handle on the back of the operator are normally made of two sections joined together so that they are acting as walls for the fuel tank as well as the handle on the back of the chain saw. The two sections are secured to each other by for example vibration welding in order to get a leak proof sealing that stops the fuel from leaking out of the tank. The handle sections are made of a suitable plastic material. In the handle are control levers or buttons placed. These control levers and buttons are normally a lever for controlling the throttle and the power of the engine and a safety button that make it impossible for the operator to press the lever controlling the throttle if the operators hand not is in the right position around the handle on the back of the chain saw. The safety button must be pressed by the operator's hand to release the locking mechanism from the lever controlling the throttle.

In several countries do laws require that tools like for example chain saws are provided with the described safety feature in order to increase the safety for the operator. The handle may also comprise more levers or buttons for controlling and steering other functions on the tool. The numbers of levers or buttons on the handle do however not affect the principle for this invention.

The levers, buttons and related components in the handle are on known chain saws secured in the handle in some different ways. Common for these different alternatives for securing levers and buttons are that all components are secured in both handle sections. The levers are for example secured to the handle by a pin extending from a recess in one handle section through a hole in the lever and ends in a similar recess in the other handle section.

The described solution however requires that the position of the two handle sections are very precise in relation to each other to make the securing of the different components work as intended and the levers turn without fastening. The two handle sections are normally joined together by vibration welding but the section could also be joined together by gluing, ultrasound welding or mirror welding.

The handle sections are designed so that the edges of the two sections will be in contact with each other when the sections are put together. When vibration welding is used is the contact surface on one of the handle sections provided with a protruding flange extending around the entire circumference of the contact surface. When the handle sections are joined together is the protruding flange rubbed against the contact surface on the opposite handle section so that the flange is heated by the friction between the flange and the contact surface on the other section until it melts. The melted material joins the two handle sections and generates a leak proof joint between the handle sections, which is necessary if the space inside the handle should be used as the fuel tank for the tool.

The problem is that manufacturing with any of the described methods makes it very complicated to achieve the necessary grade of precision between the handle sections. A lot of work is required to calibrate the equipment for joining the handle sections to make the levers and buttons work in a satisfying way. The complicated manufacturing process makes the handle, and consequently also the tool, expensive.

The invention defined by the claims reduces the required grade of precision between the handle sections by securing all levers, buttons and related components in one of the handle sections. This solution makes the function of the levers and buttons independent of the handle sections position in relation to each other. The handle is therefore considerably easier to manufacture which reduces the cost for the handle and the fuel tank.

There are three different general solutions for securing the levers and buttons in the handle section.

The first alternative is to secure the lever or button in a protruding section provided with a pocket where a part of the lever or button is placed and secured by a locking pin extending from one side of the recess through a hole in the lever or button before it ends in the opposite side of the recess.

The second alternative is to provide one of the handle sections with a pin extending in transverse direction from the handle section. The lever, button or component is put on or snapped on the pin.

The last alternative is to press a separate pin into a prepared opening or hole in the handle section and then secure the component to the pin. These three different alternatives could exist in different embodiments and be combined depending on what and where the component is secured in the handle section.

The handle sections are normally made of a plastic material with suitable features but also metallic materials could be used. The different handle sections are not necessarily made of same material. The levers and buttons are either secured in the handle section before or after the handle sections are joined together.

One embodiment of the claimed invention is illustrated in the attached figures:

FIG. 1.: Illustrates a handle on the back part of the tool body on a chain saw.

Figure 2:
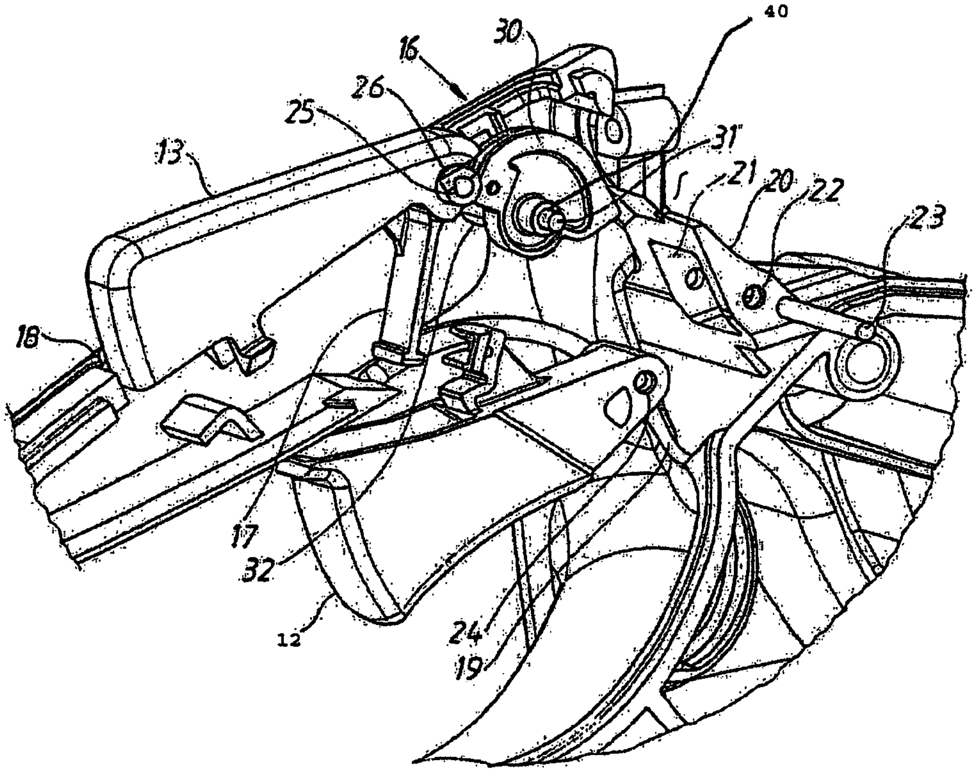

FIG. 2.: Illustrates a perspective view of a handle section provided with levers, buttons and related components secured in the handle section.

In FIG. 1 is a section of a tool body 10 for a chain saw illustrated. The section of the tool body 10 illustrated in the figure comprises for example the fuel tank 14 and a handle 11 placed on the back part of the tool body 10. The handle 11 comprises a lever 12 for controlling the throttle and a safety button 13 that reduces the power of the engine to no load operation and makes it impossible to increase the power of the engine if the operator not hold his hand in the intended position around the handle 11. To make it possible for the operator to increase the power of the engine must the safety button 13 be pressed by the hand of the operator since an arm 17 extending from the safety button 13 is blocking the lever 12 when the safety button 13 not is pressed.

The handle 11, and the fuel tank 14, is made of two sections 15 and 16 joined together by for example by gluing, vibration welding, ultrasound welding or mirror welding so that there is a leak proof joint between the two sections 15 and 16 at least in that part of the handle 14 that is acting as fuel tank 14. In the illustrated embodiment is the contact surface between the sections 15 and 16 placed in a plane through the longitudinal centre of the handle 11 but the contact surface could also be placed in a plane at any side of the longitudinal centre of the handle or in a plane not parallel with the plane through the longitudinal axle of the handle 11.

The handle 11 is provided with a surface 33. After the sections are joined together and the levers and buttons are mounted is the surface 33 covered by a not illustrated layer to give the gripping surface on the handle 11 a smooth and comfortable shape. The layer is made of a material that is comfortable for the operator to hold.

In FIG. 2 is the claimed type of handle section 16 illustrated. The handle section 16 joined together with the other handle section 15 makes the handle 11 on the back of the chain saw.

The lever 12 for controlling the throttle is placed in a second recess 19 and the safety button 13 in a first recess 19 in the handle section 16. The other handle section 15 is provided with similar recesses for the lever 12 for and the button 13.

The lever 12 for controlling the throttle is not placed in its final position in the handle section 16 illustrated in FIG. 2 in order to make it easier to view the new shape of the handle section 16. The handle section 16 is provided with a supporting section 20 extending outside the plane defined by the contact surfaces between the handle sections 15 and 16. The supporting section 20 is provided with a pocket 21 where the forward end of the lever 12 for controlling the throttle is placed. The supporting section 20 is provided with two openings 22 for a locking pin 23 that the lever 12 for controlling the throttle will turn around. When the lever 12 is in the right position in the pocket 21 is the locking pin 23 pushed through the openings 22 and a hole 24 in the lever 12 so that the lever 12 is secured in the supporting section 20 and the handle section 16. The lever 12 is thereby secured in the chain saw handle 11 without involving the other handle section 15. If the lever 12 is secured in the supporting section 20 after the handle sections 15 and 16 are joined is the locking pin 23 pushed into its locking position via a hole 35 in one the opposite handle section 15. This is the first alternative for securing levers, buttons or components in one handle section 16.

The second alternative for securing components in the handle section 16 is used for securing of the safety button 13. A pin 25 extending from the handle section 16 secures the safety button 13. The pin 25 is extending substantially transverse direction to the contact surface between the two handle sections 15 and 16 and is acting as the axle that the safety button 13 is turning around inside the handle 11. The safety button 13 is in the forward end provided with a keyhole-shaped opening 26 that makes it possible to snap the safety button 13 on the pin 25 by pressing the keyhole-shaped opening 26 against the pin so that the pin 25 is locked in the circular section of the keyhole-shaped opening 26. The pin 25 is shaped so that the safety button 13 is positioned in the centre of the first recess 18 in the handle 11 to make sure that the safety button 13 not will align the edges of the first recess 18 in the handle section 16 or the opposite recess in the other handle section. In order to stabilize the pin 25 is the other handle section 15 provided with a protruding circular-shaped edge 34 surrounding almost the entire pin. The protruding circular-shaped edge 34 has a bigger diameter than the pin so that there is a gap between the inside of the protruding circular-shaped edge 34 and the pin 25. When the handle sections 15 and 16 are joined is the pin 25 placed in the protruding circular-shaped edge 34 so that the protruding circular-shaped edge 34 is acting as a support for the pin 25 and prevents that the pin 25 is deformed or breaks when exposed to high loads. The diameter to the inside edge of the protruding circular-shaped edge 34 is bigger than the diameter of the pin 25 in order to not increase the required grade of precision between the handle sections 15 and 16. The described solution for securing the safety button 13 in the handle 11 could also be used for securing other components in the handle 11.

The third alternative for securing components is for example used to secure a line wheel 30 in the handle section 16. The line wheel 30 transforms the movement in the lever 12 for controlling the throttle to an axial movement in the not illustrated gas wire or line connected to the throttle. The line wheel 30 is secured to the handle section 16 by a separate metal or plastic pin 31 is pressed into a prepared opening or hole 32 in the handle section 16. The line wheel 30 is then put on the metal or plastic pin 31 acting as the axle for the line wheel 30. The other handle section 15 is, like in the second alternative, provided with a supporting edge 36 with bigger diameter than the diameter of the metal or plastic pin 31 to support the metal or plastic pin 31 when it is exposed to high loads without increasing the required grade of precision between the handle sections 15 and 16. If the line wheel 30 is mounted after the handle sections 15 and 16 are joined is the line wheel 30 placed in the right position before the metal or plastic pin 31 is pressed through the prepared opening from the outside of the handle 11.

The invention claimed is:

1. A handle forming part of a hand held engine power tool, the handle comprising:

a first handle section and a second handle section;

the first handle section having a supporting section integrally formed with the first handle section and extending from the first handle section into the second handle section, the support section including a first surface and a second surface, a space being defined between the first surface and the second surface, the first surface having a first hole formed therethrough, the second surface having a second hole formed therethrough;

a control component operative to control power of the tool, the control component having a mounting hole formed therethrough, wherein the control component is a lever operative to control power of the engine;

a locking pin sized and shaped to be inserted through the first hole, the mounting hole and the second hole and to be retained by the supporting section such that the control component spans the space and is pivotally supported by the supporting section of the first handle section; and a safety button, mounted to the first handle section, operative to prevent an operator from increasing the power of the engine if the safety button is not actuated, wherein:

the safety button has an opening;

the first handle section has a pin extending in a transverse direction relative to a longitudinal axis of the safety button; and the opening is operative to engage about the pin and secure the safety button to the pin such that the safety button pivots about the pin, and wherein the second handle section has a protruding circle-shaped edge positioned to receive a distal end of the pin and support the pin responsive to loading of the safety button.

2. The handle of claim 1, further comprising a leak proof joint attaching the first handle section and the second handle section such that a fuel tank is formed between the first handle section and the second handle section.

3. The handle of claim 1, wherein the space forms a portion of a pocket, the pocket being defined at least in part by the first surface and the second surface.

4. The handle of claim 1, wherein the supporting section extends away from the first handle section substantially perpendicular to a plane defined by contact surfaces between the first and second handle sections.

5. The handle of claim 1, wherein the mounting hole is disposed at a portion of the control component that extends farther into the supporting section than any other portion of the control component.

6. A handle forming part of a hand held engine power tool, the handle comprising:

a first handle section and a second handle section;

the first handle section having a supporting section integrally formed with the first handle section and extending from the first handle section into the second handle section, the support section including a first surface and a second surface, a space being defined between the first surface and the second surface, the first surface having a first hole formed therethrough, the second surface having a second hole formed therethrough;

a control component operative to control power of the tool, the control component having a mounting hole formed therethrough, wherein the control component is a safety button operative to prevent an operator from increasing power of the engine if the safety button is not actuated;

a locking pin sized and shaped to be inserted through the first hole, the mounting hole and the second hole and to be retained by the supporting section such that the control component spans the space and is pivotally supported by the supporting section of the first handle section; and a lever, mounted to the first handle section, operative to control the power of the engine, wherein:

the lever has an opening;

the first handle section has a pin extending in a transverse direction relative to a longitudinal axis of the lever; and the opening is operative to engage about the pin and secure the lever to the pin such that the lever pivots about the pin, and wherein the second handle section has a protruding circle-shaped edge positioned to receive a distal end of the pin and support the pin responsive to loading of the lever.

* * * * *

UNITED STATES PATENT AND TRADEMARK OFFICE

CERTIFICATE OF CORRECTION

PATENT NO. : 8,490,289 B2
APPLICATION NO. : 10/532353
DATED : July 23, 2013
INVENTOR(S) : Mattias Nystrom et al.

It is certified that error appears in the above-identified patent and that said Letters Patent is hereby corrected as shown below:

On the Title Page, at column 1, Item (30), "0203159" should read --0203159-9--

Signed and Sealed this
Seventeenth Day of September, 2013

Teresa Stanek Rea
*Deputy Director of the United States Patent and Trademark Office*